Nov. 12, 1968 R. SHAHBENDER 3,411,149

MAGNETIC MEMORY EMPLOYING STRESS WAVE

Filed Sept. 4, 1964 3 Sheets-Sheet 1

INVENTOR.
RABAH SHAHBENDER
BY
Carl V. Olson
Attorney

INVENTOR.
RABAH SHAHBENDER
BY Carl V. Olson
Attorney

MAGNETIC MEMORY EMPLOYING STRESS WAVE

Filed Sept. 4, 1964 3 Sheets-Sheet 3

INVENTOR.
RABAH SHAHBENDER
BY
Carl V. Olson
Attorney

United States Patent Office 3,411,149

Patented Nov. 12, 1968

3,411,149

MAGNETIC MEMORY EMPLOYING STRESS WAVE

Rabah Shahbender, Princeton, N.J., assignor to Radio Corporation of America, a corporation of Delaware Filed Sept. 4, 1964, Ser. No. 394,545
13 Claims. (Cl. 340—174)

This invention relates to information storage systems, and particularly to memories in which access to storage locations is accomplished by means of a stress wave propagated through magnetic material.

When a magnetic element is subjected to a mechanical stress, the hysteresis loop characteristics of the material change. For example, the corrective $H_c$ necessary to switch the direction of magnetization in the magnetic material is changed. Thus, an electric current pulse in a conductor linking the magnetic material may have an amplitude which is sufficient to switch the direction of magnetic flux where the magnetic material is stressed, but which is insufficient to switch flux where the magnetic material is unstressed.

Moreover, the stressing of a magnetic material induces an electrical sense signal in a conductor linking the magnetic material. The polarity of the sense signal corresponds with the direction of flux in the magnetic material and is indicative of the storage of a "1" or a "0" information bit. The reading stored information is nondestructive because the magnetic flux returns to its original condition.

In an array of memory elements where the memory elements consist of magnetic material linked by an electrical conductor, an individual memory element may be accessed by a sonic stress wave passed successively through the memory elements. When writing information into a selected memory element, a current pulse is applied to the electrical conductor in time coincidence with the arrival at the memory element of a stress wave.

In constructing transducers for translating an electrical pulse into a stress wave pulse which travels along a row of memory elements with low attenuation, it is found to be difficult to create a stress wave pulse having both a desired intensity and a desired short duration. The stress wave pulse has an undesirably long duration. Stated another way, the time interval between the passage past a point in the material of the leading and trailing edges of the stress pulse is undesirably long. The stress wave pulse spans a correponding long physical distance in the direction of its propagation. Heretofore, memory elements were appropriately separated so that only one at a time was affected by the stress wave. The result is that known stress wave magnetic memories are unduly large in physical dimensions and are correspondingly slow in operation.

It is an object of the invention to provide an improved sonic stress wave memory having a relatively high density of individual magnetic memory elements.

It is another object to provide an improved sonic stress wave memory wherein a considerable number of individual memory elements are simultaneously stressed at any given instant and are individually accessed by means of an equal number of respective electrical conductors.

It is yet another object to provide an improved memory system capable of the simultaneous storage and retrieval of a number of bit-serial information signals, or, stated another way, the storage and retrieval of word-serial information signals in which each word contains many bits.

It is a further object to provide an improved memory construction including thin magnetic films deposited on a substrate through which an accessing sonic stress wave is propagated.

According to an example of the invention, there is provided a row of magnetic memory elements and means to propagate a sonic stress wave through the row of memory elements, the elements being closely spaced so that a plurality of elements are stressed at any instant by the stress wave. The individual magnetic memory elements may be constituted by a thin film spot of magnetic material deposited on a substrate providing a good conductor for a sonic stress wave. Individual electrical conductors link respective memory elements capable of being stressed at any one instant. Each electrical conductor also links other non-adjacent memory elements which are sufficiently spaced from each other so that only one is stressed at a time. When writing, bit-serial information signals are applied to respective electrical conductors in time-position synchronism with a sonic stress wave passed through the row of memory element. When reading, a stress wave applied through the row of memory elements results in the inducing of bit-serial information signals on each of the electrical conductors. The reading process does not destroy the stored information. The arrangement described may be extended to include a plurality of rows of magnetic elements.

According to another example of the invention, each stress wave is a burst of stress waves. The individual cycles of the stress wave burst are spaced apart a distance equal to the distance between successive individual magnetic memory elements.

Figure 1:
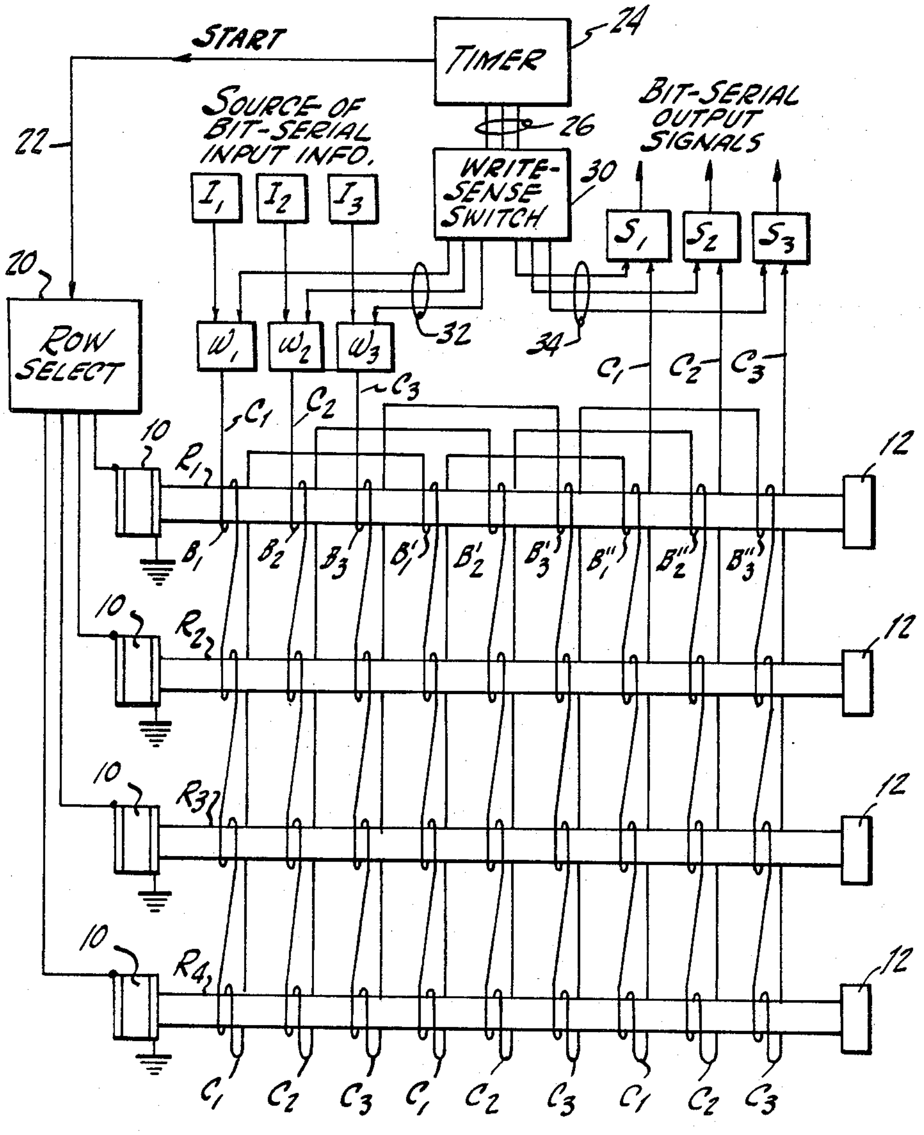
FIG. 1 is a diagram of an array of magnetic memory elements and electronic means for selectively accessing the memory elements.

Referring now in greater detail to FIG. 1, there is shown a magnetic magnetostrictive member or rod $R_1$ made of material such as permalloy. A row of magnetic memory elements $B_1$, $B_2$, $B_3$, $B_1'$, etc., through $B_3''$ is constituted along the rod $R_1$ by the magnetic material and by electrical conductors $C_1$, $C_2$ and $C_3$ linking the magnetic material at equally spaced intervals along the rod $R_1$. A transducer 10 is provided at one end of the magnetostrictive rod $R_1$ for the purpose of generating a sonic stress wave pulse which propagates through the rod $R_1$ to the opposite end where it is absorbed without reflection by a mechanical damping termination 12. The transducer 10 may be a piezoelectric crystal which, in response to an electrical pulse applied to its terminals, generates a longitudinal mode sonic stress wave. Other known transducers and stress wave modes may be employed.

The individual memory elements $B_1$ through $B_3''$ along the rod $R_1$ are closely spaced in relation to the distance between the leading and trailing edges of a sonic stress wave propagated through the magnetostrictive rod. The transducer 10 and the rod $R_1$ are designed to produce a sonic stress wave pulse which has a required amplitude and which has a given minimum practical dimension between its leading and trailing edges in the direction of propagation through the rod $R_1$. The minimum practical extent or span of a sonic stress wave is undesirably large in relation to the desired close space of magnetic elements along the rod.

The desired close spacing of magnetic elements is accomplished by employing a conductor $C_1$ linking non-adjacent memory elements $B_1$, $B_1'$ and $B_1''$, a conductor $C_2$ linking non-adjacent elements $B_2$, $B_2'$ and $B_2''$, and a conductor $C_3$ linking non-adjacent memory elements $B_3$, $B_3'$ and $B_3''$. Adjacent memory elements $B_1$, $B_2$ and $B_3$ fall within the dimension spanned by the leading and trailing edges of a sonic stress wave and may all be stressed at a given instant of time. However, these memory elements are linked by individual electrical conductors $C_1$, $C_2$ and $C_3$ through which individual information signals may be written into or read out of the respective memory elements when they are all simultaneously stressed. The number of consecutive memory elements $B_1$, $B_2$ and $B_3$, and the corresponding number of individual conductors $C_1$, $C_2$ and $C_3$ is selected to be substantially equal to and not more than the number of memory elements spanned by a stress wave pulse.

Additional magnetostrictive rods $R_2$, $R_3$ and $R_4$ are similarly provided with a transducer 10 at one end and a termination 12 at the other end. The conductors $C_1$, $C_2$ and $C_3$ linking memory elements $B_1$ through $B_3''$ on magnetostrictive rod $R_1$ also link corresponding memory elements on all of the magnetostrictive rods $R_2$, $R_3$ and $R_4$. Only one of the four transducers 10 shown is electrically energized at one time from a row selection circuit 20. The row selection circuit 20 is supplied with a start pulse over a line 22 from a timber 24. The timer 24 also supplies timing signals over lines 26 to a write-sense switch 30 which directs the timing signals over write output lines 32 or over sense output lines 34. The write output lines 32 are connected to respective write pulse generators $W_1$, $W_2$ and $W_3$ having outputs connected to respective conductors $C_1$, $C_2$ and $C_3$. The write drivers $W_1$, $W_2$ and $W_3$ are also receptive to individual sources $I_1$, $I_2$ and $I_3$ of bit-serial input information.

The timing pulse outputs on lines 34 from the write-sense switch 30 are connected to respective sense amplifiers $S_1$, $S_2$ and $S_3$. The sense amplifiers are also receptive to signals induced on the respective conductors $C_1$, $C_2$ and $C_3$. The sense amplifiers $S_1$, $S_2$ and $S_3$ are shown as connected to opposite ends of the same conductors $C_1$. $C_2$ and $C_3$ as the respective write pulse generators $W_1$, $W_2$ and $W_3$. It is to be understood that the conductors $C_1$, $C_2$ and $C_3$ should be provided with suitable terminations, as is conventional, to minimize reflections and permit the conductors to be used for both reading and writing purposes. Alternatively, each of the conductors $C_1$, $C_2$ and $C_3$ may be constituted by two separate conductors, one of which is connected to a sense amplifier and the other of which is connected to a write pulse generator.

The operation of the system of FIG. 1 will now be described with references to the timing chart of FIG. 2. A write cycle is initiated by energizing the timer 24 to supply a start pulse 40 (FIG. 2) over line 22 to the row selector circuit 20. The row selector circuit 20 directs the start pulse to one of the transducers 10. It will be assumed that the transducer 10 at the end of the magnetostrictive rod $R_1$ receives the start pulse. The start pulse applied to the transducer 10 causes the generation of a sonic stress wave which propagates down the length of the magnetostrictive rod $R_1$ at the speed of sound through the medium. The duration of the sonic stress wave is assumed to be as represented at 42 in FIG. 2 and to be such that the stress wave spans not more than three adjacent ones of the memory elements $B_1$ through $B_3''$ at any given instant of time.

The timer 24 supplies timing pulse waves $T_1$, $T_2$ and $T_3$ (FIG. 2) through the write-sense switch 30 to respective write pulse generators $W_1$, $W_2$ and $W_3$. The write drivers, when activated by the timing pulses, respond to the information signals from the sources $I_1$, $I_2$ and $I_3$ to appropriately energize the conductors $C_1$, $C_2$ and $C_3$ in accordance with the "1" and "0" information from the sources. The amplitudes of the information signals supplied to the conductors $C_1$, $C_2$ and $C_3$ are sufficient to change the magnetic states of the memory elements $B_1$ through $B_3''$ solely when the memory elements are stressed by the propagated sonic stress wave. The sonic stress wave causes a temporary reduction in the magnetizing force needed to change the magnetic state of the material from a condition representing the storage of a "1" or a condition representing the storage of a "0."

Figure 2:
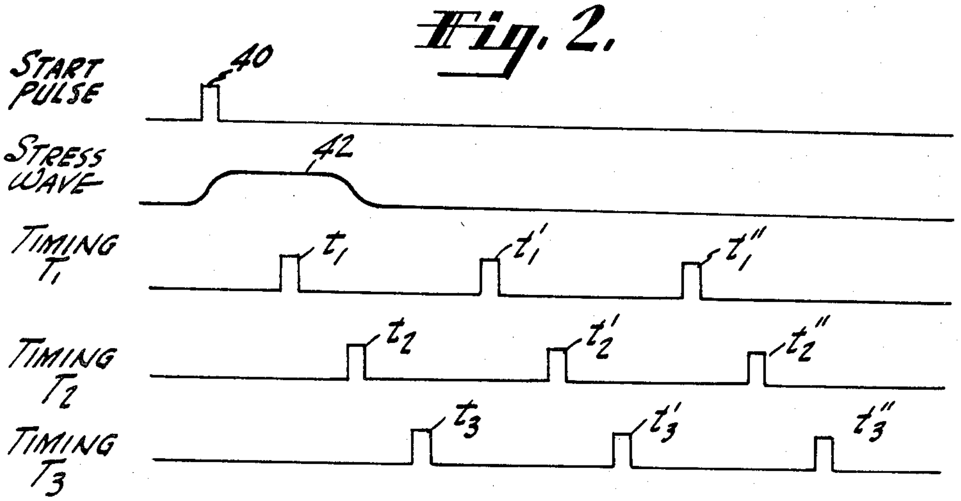
FIG. 2 is a time chart which will be referred to in explaining the operation of the system of FIG 1.

When the stress wave is at the position represented at 42 in FIG. 2, the memory element $B_1$ is stressed and receptive to a write signal occurring at the time $t_1$. The write signal applied through conductor $C_1$ linking memory elements $B_1$, $B_1'$ and $B_1''$ is effective solely on the memory element $B_1$ because only element $B_1$ is stressed at this time.

As the stress wave propagates down the row of memory elements, the timing pulse $t_1'$ energizes the conductor $C_1$ at a time when solely the memory element $B_1'$ of the group $B_1$. $B_1'$ and $B_1''$ is stressed. In this way, the writing of bit serial information from information source $I_1$ is accomplished in memory elements $B_1$, $B_1'$ and $B_1''$ at the times of pulses $t_1$, $t_1'$ and $t_1''$ during the propagation of a sonic stress wave along the row of memory elements. The writing of information from source $I_2$ in time-interlaced fashion at the times of pulses $t_2$, $t_2'$ and $t_2''$ is accomplished during the same propagation cycle of the sonic pulse wave. Likewise, during the same propagation of the sonic stress wave, information is written from source $I_3$ into memory elements $B_3$, $B_3'$ and $B_3''$ at the times of pulses $t_3$, $t_3'$ and $t_3''$.

In the nondestructive reading of stored information, a start pulse is applied from timer 24 through the row selector circuit 20 to the transducer 10 of a selected one of the magnetostrictive rods. The resulting stress wave is propagated along the selected rod and it causes the inducing of sense signals on the conductors at each memory element in the row. The sense signals have a polarity indicative of whether the memory element was storing a "1" or a "0" information bit. The inducing of electrical sense signals in response to the passage through the magnetic material of a stress wave results from a well-known physical phenomenon called the Villari effect. The stress wave momentarily changes the number of flux lines linking the electrical conductor and thus induces a sense signal in the conductor. After the stress wave passes, the magnetic material returns to its previous condition indicative of the storage of a "1" or "0."

The timing pulse waves $t_1$, $t_2$ and $t_3$ from the timer 24 are directed through the write-sense switch 30 to the sense amplifiers $S_1$, $S_2$ and $S_3$. The timing pulses strobe or energize the sense amplifiers to sequentially respond to the bit-serial sense signals induced on each of the conductors $C_1$, $C_2$ and $C_3$. The application of timing pulses to the sense amplifiers is not absolutely necessary because the sense signals reach the respective sense amplifiers in orderly time sequence determined by the propagation of the sonic stress wave. However, it is desirable to have the sense amplifiers inactive or disabled during the writing of information into the memory.

Figure 3:
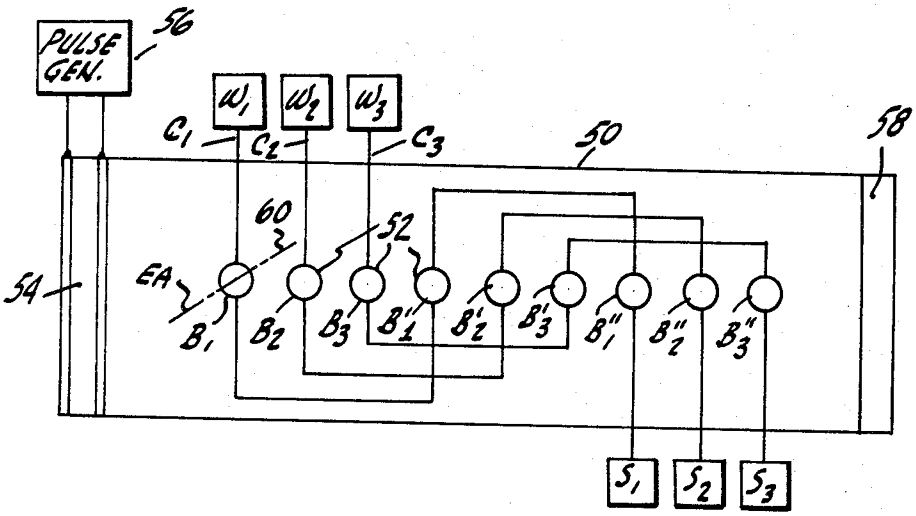
FIG. 3 is a diagram illustrating a different physical construction, using thin magnetic film memory elements, which may be employed in the system of FIG 1.

The system illustrated in FIG. 1 including rows of magnetostrictive magnetic memory elements through which a sonic pulse wave is propagated may also be constructed using rows of thin magnetic film spots on a sonic conductor as illustrated in FIG. 3. In FIG. 3, a substrate 50, which may be glass, is provided with a row of thin magnetic film spots 52 which cooperate with conductors $C_1$, $C_2$ and $C_3$ to form a row of magnetic memory elemets $B_1$ through $B_3''$. The conductors are connected to write amplifiers and sense amplifiers after the manner illusrated in FIG 1. The sonic substrate 50 is provided at one end with a sonic transducer 54 electrically energized from an electrical pulse generator 56. The opposite end of the sonic substrate 50 is physically terminated at 58 to prevent undesired sonic reflections.

Each individual thin magnetic film spot 52 is preferably deposited to have an anisotropic easy axis 60 in a direction angularly related to the corresponding electrical conductor and the direction of propagation of the sonic stress wave from the transducer 54.

In the operation of the arrangement of FIG. 3, a sonic stress wave propagated along the row of thin magnetic film spots 52 causes a stressing of the magnetic material which tends to make the easy axis rotate to a direction aligned with the direction of particle motion inherent in the stress wave. The rotation of flux resulting from the rotation of the easy axis causes the inducing of a sense signal on the corresponding electrical conductor. The polarity of the induced sense signal depends on whether the thin magnetic film spot was magnetized in one direction or another along its easy axis. The two directions correspond with the storage of a "1" or a "0" information bit. The direction of flux along the easy axis 60 is determined when writing information by the polarity of the current pulse supplied through the corresponding conductor from the respective write pulse generator W.

The single row of thin magnetic film memory elements shown in FIG. 3 may be employed as a single unit, or may be employed as one of many rows of magnetic elements in a system like that of FIG. 1. The operation of the memory system of FIG. 3 is generally similar to the operation described in connection with the system of FIG. 1. Writing is accomplished by propagating a sonic stress wave along the row of memory elements and coupling bitserial information signals to the conductors in time-position synchronism with the movement of the stress wave. Reading is accomplished by propagating a stress wave along the row of memory elements and sensing the information signals that are successively induced on the electrical conductors.

Figure 4:
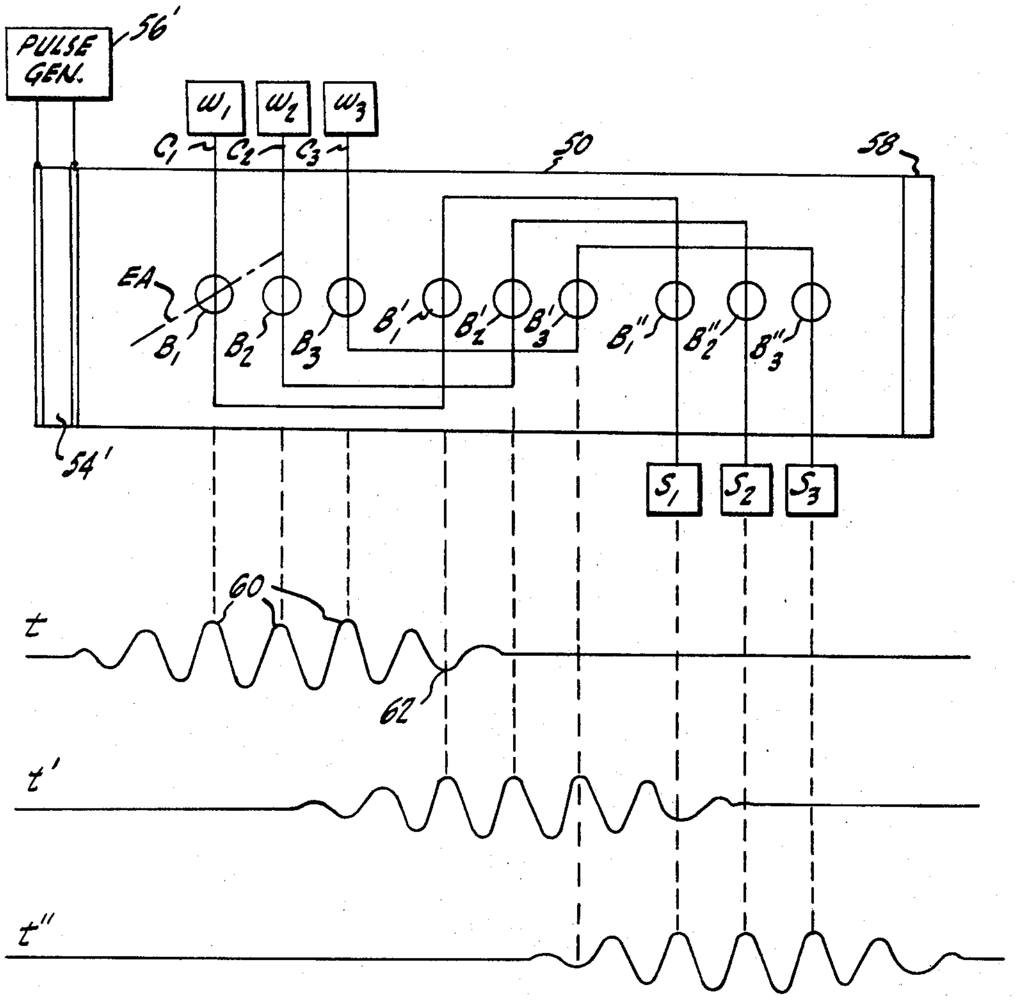
FIG. 4 is a digram illustrating a stress wave memory employing a burst of stress waves having cycles related to the spacing of the magnetic memory elements.

FIG. 4 shows a stress wave magnetic memory similar to the one shown in FIG. 3 but differing therefrom in that a pulse generator 56' is provided which energizes a transducer 54' to generate a burst of sonic stress waves, rather than a single stress wave pulse. The burst of stress waves is propagated through the row of magnetic memory elements $B_1$ through $B_3''$. Three successive instantaneous positions of the propagated burst of stress waves are represented at *t, t'* and *t''*. The frequency of the individual waves or cycles in the burst of stress waves is selected so that the distance between successive individual waves is equal to the spacing between the magnetic memory elements of the group including $B_1$, $B_2$ and $B_3$. The spacing of the waves is also equal to the spacing of the magnetic memory elements in the group $B_1'$, $B_2'$, $B_3'$ and the group $B_1''$, $B_2''$, $B_3''$. The space between the last magnetic element of one group and the first magnetic element of the following group may be greater than the space between elements of one group, as shown. The spacing may be selected to minimize the possibility of the effective stressing at one instant of time of memory elements in more than one group. In the operation of the memory of FIG. 4, information is recorded in the magnetic memory elements $B_1$, $B_2$ and $B_3$ at the instant when the propagated burst of stress waves reaches the position *t*. At this time, the three memory elements are simultaneously stressed in the direction represented by the positive peaks 60 of the burst shown at *t*. At this time instant, the write drivers $W_1$, $W_2$ and $W_3$ are simultaneously energized to cause a switching of the three stressed magnetic memory elements to directions indicative of corresponding "1" and "0" information signals. The current flowing in conductor $C_1$ from the write driver $W_1$ does not affect the memory element $B_1'$ in the following group because the element $B_1'$ is stressed in the wrong direction to permit a change in the magnetic flux. This is illustrated by the negative polarity of the stress at 62. Element $B_2'$ is not affected because no stress is applied to it.

At a following instant of time, the propagated burst of stress waves reaches the position represented at *t'*. At this instant, the write drivers $W_1$, $W_2$ and $W_3$ energize the conductors $C_1$, $C_2$ and $C_3$ to record information in the memory elements $B_1'$, $B_2'$ and $B_3'$ in the second group of memory elements. Similary, at a following instant of time when the propagated burst of stress waves reaches position *t''*, information is recorded in memory elements of the third group. It is therefore seen that write drivers $W_1$, $W_2$ and $W_3$ each supply bit-serial information signals which are successively recorded in the three groups of magnetic memory elements.

When it is desired to reproduced the information stored in the memory of FIG. 4, a burst of stress waves is again generated in the transducer 54' and propagated through the row of magnetic memory elements. At the three instants when the propagated burst passes through the positions represented at *t, t'* and *t''* information signals are induced on the conductors $C_1$, $C_2$ and $C_3$ and are sensed by the sense amplifiers $S_1$, $S_2$ and $S_3$. The sense amplifiers simultaneously provide outputs corresponding with the information stored in memory elements $B_1$, $B_2$ and $B_3$ of the first group, then supply output signals corresponding with the information stored in the second group, and finally supply output signals corresponding with information stored in elements of the third group. All of the amplifiers are strobed at the times *t, t', t''* so that they provide outputs only at the desired instants of time.

The use, as illustrated in FIG. 4, of a burst of stress waves is advantageous because the generation and propagation of a burst of stress waves is more easily and effectively accomplished than the generation and propagation of a narrow single stress wave. The higher frequency of the cycles of a burst of stress waves is characterized in being propagated over a given distance with less attenuation than a lower frequency stress wave. The burst of stress waves also produces peaks of stress having a desired higher amplitude than can conveniently be provided using a single stress wave. A further advantage results from the arrangement wherein the peaks of the cycles of a stress burst are related to the spacing of the individual magnetic memory elements. All of the memory elements of a group can be simultaneously stressed for the reading and writing of information. The memory elements $B_1$, $B_2$ and $B_3$ of the first group may be used for the storage of one word having bits all of which are accessed in parallel. Each of the second and third groups of memory elements provides storage space for successively accessed different words.

The use of three conductors $C_1$, $C_2$ and $C_3$ in the arrangements of FIGS. 1, 2 and 3 is purely illustrative. The number of conductors is determined by the number of closely spaced memory elements which are spanned by a sonic wave pulse having a minimum practical duration. The systems described overcome the space and operating speed limitations imposed by the dimension in the direction of propagation of a sonic wave pulse, and permit the efficient and effective storage of a large number of information bits in a given physical space.

What is claimed is:

1. The combination of
a group of magnetic elements,
means to propagate a sonic stress wave through said group of magnetic elements, said magnetic elements being closely spaced so that said sonic stress wave spans a plurality of magnetic elements, and
a number of conductors substantially equal to and not more than the number of magnetic elements spanned by a sonic stress wave, each of said conductors linking a plurality of magnetic elements which are sufficiently spaced from each other so that only one is stressed at a time.

2. A memory array comprising
a group of thin magnetic film memory elements,
means to propagate a sonic stress wave through said group of memory elements, said memory elements being closely spaced so that said sonic stress wave spans a plurality of memory elements, and
plurality of conductors each linking a plurality of non-adjacent memory elements which are sufficiently spaced from each other so that only one is stressed at a time.

3. A memory array comprising
a row of magnetic memory elements,
means to propagate a sonic stress wave through said row of memory elements, said memory elements being closely spaced so that said sonic stress wave spans a plurality of memory elements,
a plurality of conductors each linking a plurality of non-adjacent memory elements which are sufficiently spaced from each other so that only one is stressed at a time,
means to energize each of said conductors with bit-serial information signals occurring in time-position synchronism with a sonic stress wave passing through memory elements linked by the conductor, and
a plurality of sense means each coupled to one of said conductors to receive stored information in the form of bit-serial information signals induced on the conductor in response to the propagation of a sonic stress wave through the row of memory elements.

4. A memory array comprising
a row of magnetic memory elements,
means to propagate a sonic stress wave through said row of memory elements, said memory elements being closely spaced so that said sonic stress wave spans a plurality of memory elements,
a number of conductors substantialy equal to and not greater than the number of memory elements spanned by a sonic stress wave, each of said conductors linking a plurality of non-adjacent memory elements which are sufficiently spaced from each other so that only one is stressed at a time,
means to energize each of said conductors with bit-serial information signals occurring in time-position synchronism with a sonic stress wave passing through memory elements linked by the conductor, and
a plurality of sense amplifiers each coupled to one of said conductors to receive stored information in the form of bit-serial information signals induced on the conductor in response to the propagation of a sonic stress wave through the row of memory elements.

5. The combination of
a plurality of rows of magnetic memory elements,
means to propagate a sonic stress wave through any selected one of said rows of memory elements, said memory elements in each row being closely spaced so that said sonic stress wave spans a plurality of memory elements, and
a plurality of conductors each linking a plurality of memory elements in one row which are sufficiently spaced from each other so that only one memory element in the row is stressed at a time, each conductor also linking corresponding memory elements of all other rows.

6. A memory array comprising
a plurality of rows of magnetic memory elements,
means to propagate a sonic stress wave through any selected one of said rows of memory elements, said memory elements in each row being closely spaced so that said sonic stress wave spans a plurality of memory elements,
a plurality of conductors each linking a plurality of memory elements in one row which are sufficiently spaced from each other so that only one memory element in the row is stressed at a time, each conductor also linking corresponding memory elements of all other rows,
means to energize each of said conductors with bit-serial information signals occurring in time-position synchronism with a sonic stress wave passing through memory elements linked by the conductor along any selected one of said rows, and
a plurality of sense amplifiers each coupled to one of said conductors to receive stored information in the form of bit-serial information signals induced on the conductor in response to the propagation of a sonic stress wave through any selected one of the rows of memory elements.

7. A memory array comprising
a plurality of rows of magnetic memory elements,
means to propagate a sonic stress wave through any selected one of said rows of memory elements, said memory elements in each row being closely spaced so that said sonic stress wave spans a plurality of memory elements,
a number of conductors substantially equal to and not greater than the number of memory elements spanned by a sonic stress wave, each of said conductors linking a plurality of non-adjacent memory elements in one row which are sufficiently spaced from each other so that only one memory element in the row is stressed at a time, each conductor also linking corresponding memory elements of all other rows,
means to energize each of said conductors with bit-serial information signals occurring in time-position synchronism with a sonic stress wave passing through memory elements linked by the conductor along any selected one of said rows, and
a plurality of sense amplifiers each coupled to one of said conductors to receive stored information in the form of bit-serial information signals induced on the conductor in response to the propagation of a sonic stress wave through any selected one of the rows of memory elements.

8. A memory array comprising
a plurality of rows of thin film magnetic memory elements,
means to propagate a sonic stress wave through any selected one of said rows of memory elements, said memory elements in each row being closely spaced so that said sonic stress wave spans a plurality of memory elements,
a number of electrical conductors substantially equal to or less than the number of memory elements spanned by a sonic stress wave, each of said conductors linking a plurality of nonadjacent memory elements in one row which are sufficiently spaced from each other so that only one memory element in the row is stressed at a time, each conductor also linking corresponding memory elements of all other rows,
means to energize each of said electrical conductors with bit-serial information signals occurring in time-position synchronism with a sonic stress wave passing through memory elements linked by the conductor along any selected one of said rows, whereby information is stored in the memory elements, and
a plurality of sense amplifiers each coupled to one of said electrical conductors to receive stored information in the form of bit-serial information signals induced on the electrical conductor in response to the propagation of a sonic stress wave through any selected one of the rows of memory elements.

9. A stress wave memory comprising
a group of magnetic elements,
means to propagate a burst of sonic stress waves through said group of magnetic elements, said burst of stress waves having a number of cycles spaced to simultaneously stress a corresponding number of magnetic elements, and
conductors linking said magnetic elements for the recording and reproducing of digital information.

10. A stress wave memory comprising
a group of magnetic memory elements,
means to propagate a burst of sonic stress waves through said group of magnetic memory elements, said burst of stress waves having a distance between cycles equal to the distance between successive magnetic memory elements, and
conductors linking respective magnetic memory elements.

11. The combination of
a row of magnetic elements,
means to propagate a burst of sonic stress waves through said row of magnetic elements, said magnetic elements being closely spaced so that said burst of sonic stress waves spans a plurality of magnetic elements, and
a number of conductors substantially equal to the number of magnetic elements spanned by a burst of sonic stress waves, each of said conductors linking a plurality of magnetic elements which are sufficiently spaced from each other so that only one is stressed at a time.

12. A memory array comprising
a row of magnetic memory elements,
means to propogate a burst of sonic stress waves through said row of memory elements, said memory elements being apart a distance equal to the distance between cycles of said burst, and
a plurality of conductors each linking a plurality of non-adjacent memory elements which are sufficiently spaced from each other so that only one is effectively stressed at a time.

13. A memory array comprising
a row of magnetic memory elements arranged in successive groups,
means to propagate a burst of sonic stress waves through said row of memory elements, said memory elements of each group being spaced apart a distance equal to the distance between cycles of said burst, said burst spanning the memory elements of one group,
a plurality of conductors each linking one memory element of each group,
means to energize each of said conductors with bit-serial information signals occurring in time-position synchronism with a sonic stress wave passing through memory elements linked by the conductor, and
a plurality of sense means each coupled to one of said conductors to receive stored information in the form of bit-serial information signals induced on the conductor in response to the propagation of a sonic stress wave through the row of memory elements.

References Cited

UNITED STATES PATENTS

| | | | |
|---|---|---|---|
| 3,016,524 | 1/1962 | Edmunds | 333—30 X |
| 3,031,648 | 4/1962 | Haber et al. | 340—174 |
| 3,090,946 | 5/1963 | Bobeck | 340—173 |
| 3,177,450 | 4/1965 | Tzannes et al. | 333—30 |
| 3,197,719 | 7/1965 | Wells | 307—88 X |

BERNARD KONICK, *Primary Examiner.*

J. F. BREIMAYER, *Assistant Examiner.*